Patented Apr. 23, 1935

1,999,161

UNITED STATES PATENT OFFICE 1,999,161

SKIN CREAM CONTAINING MAGNESIUM HYDROXIDE

Bruce Walton, Glenbrook, Conn., assignor to Chas. H. Phillips Chemical Co., Glenbrook, Conn., a corporation of Connecticut No Drawing. Application March 29, 1934, Serial No. 718,040

6 Claims. (Cl. 167—91)

The present invention is concerned with a method of producing a skin cream containing free milk of magnesium hydroxide and with the product which results from that process. Several attempts have been made to prepare skin creams containing free magnesium hydroxide, but these attempts have either failed entirely or have resulted in products of insufficient merit to justify their acceptance by the ultimate users. It has, for example, been proposed to attempt to prepare a liquid cream containing free magnesium hydroxide by compounding a soluble alkali metal soap with ingredients which are purported to produce magnesium hydroxide. The product of such a process, however, does not contain free magnesium hydroxide and all attempts to produce a suitable product by this method have failed. No process has been available up to the present time for the production of a skin cream containing free magnesium hydroxide, nor has such a product been known.

It has now been found that an oil base skin cream exhibiting excellent properties and containing free magnesium hydroxide can be obtained provided that a high molecular weight alcohol containing at least 16 carbon atoms is employed as a component in preparing such a cream. Broadly defined the present invention is concerned with a novel skin cream comprising magnesium hydroxide, an oil, a high molecular weight alcohol containing at least 16 carbon atoms, a wax and water. A skin cream of this type possesses many advantages which have been frequently sought, but which have thus far not been realized in any single skin cream, for example, such a cream is easily absorbed by the skin with a softening action; it has sufficient available alkalinity to neutralize acidic excretions which may be found on the skin; it has a cooling action when applied in the normal way; it is useful as a powder base; it has a soothing action in cases of skin irritation; it is mildly astringent and will tend to close enlarged pores.

The oil which is employed as a base for the novel skin cream may be either normally liquid or normally solid. It is preferable to employ a semi-solid oil such as petrolatum or some similar semi-solid mineral oil base hydrocarbon. Animal or vegetable oils may also be employed, but their use is not preferred. Small amounts of such oils may, however, be employed with advantage in place of a part of the semi-solid mineral oil base hydrocarbons in certain compositions. Olive oil, for example, may be used to replace a part of the petrolatum of the compositions hereinafter described. Liquid oils may be used in preparing the novel skin cream if the other constituents of the cream are so selected as to give a final product which is solid. Liquid mineral oils, for example, may be employed instead of petrolatum if the wax content of the cream is raised.

The presence of a high molecular weight alcohol in the novel skin cream is of the utmost importance. The alcohols which can be employed in the composition are those containing at least 16 carbon atoms such as cetyl or stearyl alcohol. The preferred alcohols are those of the cholesterol type. Cholesterol itself may be advantageously employed as can iso-cholesterol or oxy-cholesterol. The alcohols employed may contain one or more hydroxyl groups, i. e. they may be mono-, di-, or polyhydric alcohols. The alcohols should have an affinity for water, i. e. they should possess properties by virtue of which they are able to absorb water at normal temperature. The cholesterol alcohols are especially effective in this respect and are also very beneficial to the skin since they are easily absorbed by the skin with a desirable softening action. This is particularly true of oxycholesterol, a cholesterol alcohol which contains a plurality of alcoholic OH groups. Oxycholesterol, therefore, represents the preferred high molecular weight alcohol for use in connection with the present invention.

The alkalinity of the novel cream is due to the presence of free magnesium hydroxide in the composition. The magnesium hydroxide may be obtained from any one of several known sources, but it is preferably obtained by employing a 7% aqueous suspension of finely divided magnesium hydroxide, the required amount of this suspension being introduced into the cream in order to obtain the desired magnesium hydroxide content. While magnesium hydroxide is not chemically inert, it does not react with the other constituents present in the skin cream described herein and is for this reason available in the final composition as free magnesium hydroxide.

Any normally solid wax may be employed in the composition. Ceresin wax is preferred, although paraffin wax, beeswax or spermacetti may be used.

Other modifying constituents which may be present in the cream are substances such as ethylene glycol, glycerine, suitable perfumes, coloring matter, etc. These substances may be added or omitted as desired.

The oil content of the cream may vary between about 20 and about 35%. Sufficient oil must be present in order to obtain a proper emulsion of all the ingredients, the exact amount of the oil also depending upon whether it is normally liquid or normally solid and upon the relative proportion of certain of the other ingredients such as the wax content, as pointed out above. The magnesium hydroxide may range in amounts from about 0.5% to 6%, but is preferably maintained between about 1% and about 5%. If too little magnesium hydroxide is employed in the cream, the desired alkalinity is not obtained, while if too much magnesium hydroxide is employed there is a tendency for the magnesium hydroxide to chalk out. The high molecular weight alcohol can range in amounts from about 1 to 4%, depending on the water content of the cream. The wax content of the cream should range between about 0.5% and about 3%. The water content may vary in amounts between about 50% and about 70%.

The following examples will serve to illustrate compositions which have been prepared in accordance with the present invention.

*Example 1*

A cream is prepared having the following composition:

| Components | Percentage composition |
|---|---|
| Magnesium hydroxide | 2.4 |
| Cholesterol | 2.7 |
| Petrolatum | 30.3 |
| Ceresin wax | 1.0 |
| Water | 60.4 |
| Ethylene glycol | 3.0 |
| Perfume | 0.2 |

Such a cream is preferably prepared as follows: The aqueous suspension of magnesium hydroxide, ethylene glycol and water are mixed together and brought to a temperature of 50° C. This admixture is then poured into a vigorously stirred mixture of the cholesterol, petrolatum and ceresin wax, the latter mixture being held at a temperature of about 55° C. After the composition is thoroughly emulsified, it is allowed to cool and the perfume is then added thereto.

*Example 2*

As an example of a further composition which can be prepared according to the present invention, the ingredients listed below may be utilized in the indicated proportions:

| Components | Percentage composition |
|---|---|
| Magnesium hydroxide | 2.3 |
| Oxycholesterol | 2.4 |
| Petrolatum | 27.0 |
| Ceresin wax | 0.8 |
| Water | 66.5 |
| Ethylene glycol | 0.8 |
| Perfume | 0.2 |

The composition is prepared after the manner set forth in Example 1.

It will be observed that while the skin cream described above contains a considerable amount of electrolyte, the final product is nevertheless a stable emulsion which contains free magnesium hydroxide in association with other ingredients which are beneficial to the skin and which do not react chemically with magnesium hydroxide.

What is claimed is:

1. A skin cream comprising petrolatum, a cholesterol alcohol, ceresin wax, a substantial amount of magnesium hydroxide and water.

2. A skin cream comprising from 0.5% to 6% of magnesium hydroxide, from 20 to 35% of petrolatum, from 1 to 4% of a cholesterol alcohol, from 0.5 to 3% of a wax and from 50 to 70% of water.

3. An oil base skin cream comprising a substantial amount of magnesium hydroxide, a high molecular weight alcohol containing at least 16 carbon atoms, a wax and water.

4. A skin cream comprising a mineral oil base hydrocarbon, a substantial amount of magnesium hydroxide, a high molecular weight alcohol containing at least 16 carbon atoms, a wax and water.

5. A skin cream containing 2.4% magnesium hydroxide, 2.7% cholesterol, 30% petrolatum, 1% ceresin, 3% ethylene glycol, the balance being water.

6. A skin cream containing 2.3% magnesium hydroxide, 2.4% oxycholesterol, 27% petrolatum, 0.8% ceresin wax, 0.8% ethylene glycol, the balance being water.

BRUCE WALTON.